(12) United States Patent
Kromer et al.

(10) Patent No.: US 7,395,443 B1
(45) Date of Patent: Jul. 1, 2008

(54) INTEGRATED CIRCUIT WITH A HIBERNATE MODE AND METHOD THEREFOR

(75) Inventors: Stephen C. Kromer, Austin, TX (US);
James J. Montanaro, Austin, TX (US);
Richard T. Witek, Austin, TX (US);
Kathryn J. Hoover, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 411 days.

(21) Appl. No.: 11/023,792

(22) Filed: Dec. 28, 2004

(51) Int. Cl.
*G06F 1/32* (2006.01)
(52) U.S. Cl. ...................... 713/324; 713/340
(58) Field of Classification Search ................. 713/324, 713/340
See application file for complete search history.

(56) References Cited

U.S. PATENT DOCUMENTS

| | | | |
|---|---|---|---|
| 4,758,945 A | 7/1988 | Remedi | |
| 5,047,987 A * | 9/1991 | Kosuge | 365/228 |
| 5,388,265 A * | 2/1995 | Volk | 713/322 |
| 5,392,437 A | 2/1995 | Matter et al. | |
| 5,502,689 A | 3/1996 | Peterson et al. | |
| 5,504,910 A | 4/1996 | Wisor et al. | |
| 5,675,808 A | 10/1997 | Gulick et al. | |
| 5,954,813 A | 9/1999 | Mann et al. | |
| 5,996,083 A * | 11/1999 | Gupta et al. | 713/322 |

* cited by examiner

*Primary Examiner*—Thuan N Du (57) ABSTRACT

An integrated circuit (100) includes a firewall input terminal, a first circuit (110, 120, 170, 172), and a second circuit (220). The firewall input terminal is for receiving a firewall input signal. The first circuit (110, 120, 170, 172) is coupled to a first power supply voltage terminal (203) and has an output for providing a control signal. The second circuit is coupled to a second power supply voltage terminal (210), to the firewall input terminal (214), and to the first circuit (110, 120, 170, 172). When the firewall input signal is inactive, an activation of the control signal affects the operation of the second circuit. When the firewall input signal is active, an activation of the control signal does not affect the operation of the second circuit.

32 Claims, 4 Drawing Sheets

INTEGRATED CIRCUIT WITH A HIBERNATE MODE AND METHOD THEREFOR

FIELD OF THE DISCLOSURE

The invention relates generally to data processors, and more particularly to data processors with low power modes.

BACKGROUND

Low power consumption is an important requirement in the design of data processing systems. For example many applications such as cell phones, personal digital assistants, and the like are powered by a battery. In order to avoid frequent battery changes or the need to connect the battery to a charger, it is desirable that all integrated circuits consume a minimum amount of power. Modern digital integrated circuit fabrication techniques use complementary metal oxide semiconductor (CMOS) transistors that facilitate low power consumption. CMOS logic circuits only consume significant amounts of power when they are switching and integrated circuits built using CMOS technology, or significant portions thereof, may be designed to operate statically, allowing the power to be reduced during periods of inactivity.

Early power reduction techniques were hardware based. For example in an electronic hand held calculator, the user would enable the arithmetic circuitry by depressing a key. The arithmetic circuitry would input the operands and perform the calculation before shutting down.

However these techniques proved to be inadequate for microprocessors which might, for example, perform periodic functions independent of any user input. U.S. Pat. No. 4,758,945 invented by James J. Remedi discloses two software-based techniques for power reduction. The first technique, known as WAIT mode, causes the clock signals to be interrupted between the oscillator and the data processing system in response to a WAIT instruction. WAIT mode takes advantage of the fact that clock signals provided to a static CMOS microprocessor can be interrupted without the microprocessor losing its state. The second technique is known as STOP mode. In STOP mode, not only are the microprocessor's clock signals interrupted, but the oscillator itself is also disabled. Thus even the power consumed by the oscillator circuit is saved. However exit from STOP mode requires a wake-up delay for the clock signals from the oscillator to stabilize before being driven to the microprocessor and STOP mode cannot be used in situations that require fast response to external events. In either WAIT mode or STOP mode, it is possible to continue to supply clock signals to an internal timer, known as a watchdog timer, to periodically wake up the microprocessor.

In MOS integrated circuits that have been placed in STOP mode, the only power consumed is due to leakage currents. In many battery-powered applications it is desirable to reduce power consumption further by eliminating even these leakage currents. However if operational power were removed from the chip, the watchdog timer would be unable to periodically reawaken the chip, and an external wakeup mechanism would be required. Furthermore such external wakeup mechanism requires additional components and adds to system cost. Thus there is a need for a new mode capable of reducing power consumption even further without increasing system cost.

BRIEF SUMMARY

Thus in one form the present invention provides an integrated circuit including a firewall input terminal and first and second circuits. The firewall input terminal is adapted for receiving a firewall input signal. The first circuit is coupled to a first power supply voltage terminal and has an output for providing a control signal. The second circuit is coupled to a second power supply voltage terminal, to the firewall input terminal, and to the first circuit. When the firewall input signal is inactive, an activation of the control signal affects the operation of the second circuit. When the firewall input signal is active, an activation of the control signal does not affect the operation of the second circuit.

In another form the present invention provides an integrated circuit comprising first and second power supply voltage terminals, a firewall input terminal, and first and second circuits. The firewall input terminal receives a firewall input signal. The firewall input signal is active to indicate that a voltage on the first power supply voltage terminal is not valid while a voltage on the second power supply voltage terminal is valid. The first circuit is coupled to the first power supply voltage terminal and has a control output. The second circuit is coupled to the second power supply voltage terminal and has a first control input coupled to the control output of the first circuit and a second control input for receiving the firewall input signal. The control output affects the operation of the second circuit selectively in response to the firewall input signal.

In yet another form the present invention provides a timing comprising a firewall input terminal, a control input terminal, an output terminal, and a firewall circuit. The firewall input terminal receives a firewall input signal. The control input terminal receives a control signal. The output terminal provides a first output signal. The firewall circuit has a first input terminal coupled to the firewall input terminal, a second input terminal for receiving the control signal, and an output terminal for providing a firewalled control signal. When the firewall input signal is active, the firewalled control signal is inactive regardless of a state of the control signal. When the firewall input signal is inactive, a state of the firewalled control signal is determined by the control signal. When active the firewalled control signal affects an operation of the timer.

In still another form the present invention provides a method for operating an integrated circuit. Operational power for a first internal circuit is received via a first power supply voltage terminal. Operational power for a second internal circuit is received via a second power supply voltage terminal. A firewall input signal is received at a firewall input terminal. When active, the firewall input signal indicates that a voltage on the first power supply voltage terminal is not valid while a voltage on the second power supply voltage terminal is valid. The second internal circuit is firewalled from the first internal circuit in response to an activation of the firewall input signal.

In yet another form the present invention provides a method for operating a computer system. Operational power is provided to a first internal circuit of an integrated circuit via a first power supply voltage terminal. Operational power is provided to a second internal circuit of an integrated circuit via a second power supply voltage terminal. A firewall signal is activated. A voltage on the first power supply voltage terminal is removed after activating the firewall signal while keeping operational power on the second power supply voltage terminal valid.

BRIEF DESCRIPTION OF THE DRAWINGS

The present disclosure may be better understood, and its numerous features and advantages made apparent to those skilled in the art by referencing the accompanying drawing, in which like reference numbers indicate similar or identical items.

DESCRIPTION OF THE PREFERRED EMBODIMENT(S)

Figure 1:
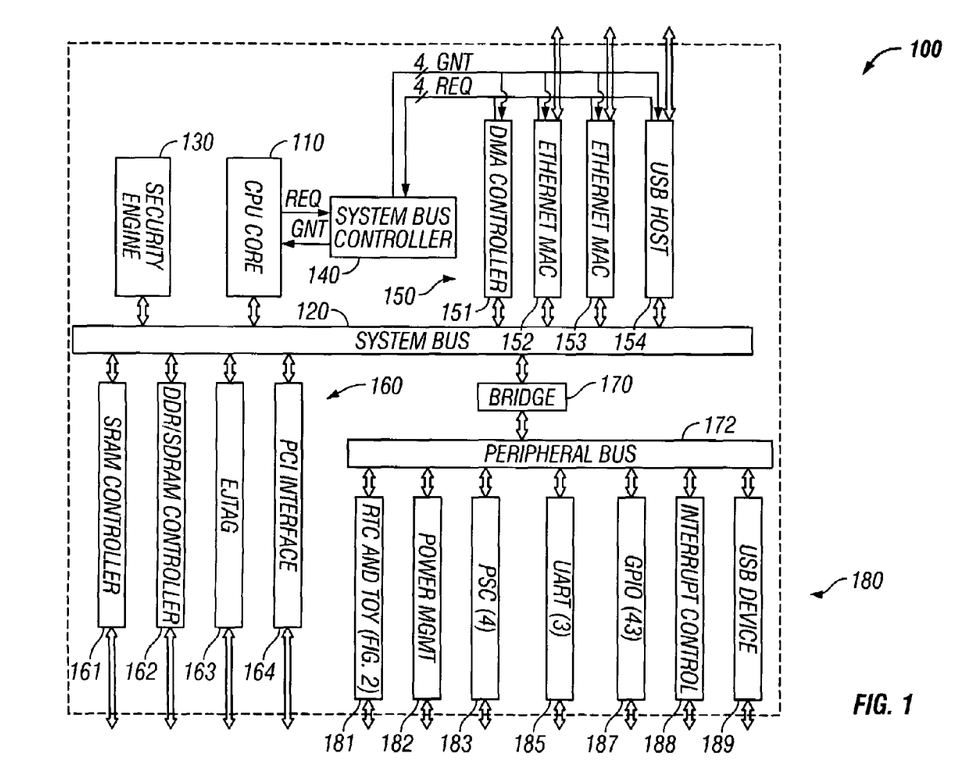
FIG. 1 illustrates in block diagram form a data processing system according to the present invention.

FIG. 1 illustrates in block diagram form a data processing system 100 according to the present invention. All the devices of data processing system 100 shown in FIG. 1 are combined into a single integrated circuit and thus data processing system 100 is referred to as a system on chip (SOC). Data processing system 100 includes generally a central processing unit (CPU) core 110, a system bus 120, a security engine 130, a system bus controller 140, a set of bus masters 150, a set of bus slaves 160, a bus bridge 170, a peripheral bus 172, and a set of peripherals 180.

CPU core 110 is a conventional CPU that is able to fetch instructions and data via system bus 120 and execute the instructions so fetched. In the illustrated embodiment CPU core 110 is a high performance CPU optimized for data intensive applications that executes reduced instruction set computer (RISC) instructions. To support high performance operation for complex SOC tasks it includes separate instruction and data caches and has a five-stage pipeline. However it should be apparent that CPU core 110 may be any type of CPU capable of running application software such as RISC, complex instruction set computer (CISC), digital signal processor (DSP), etc.

System bus 120 is a high-speed bus having a control bus portion, a 36-bit address bus portion, and a 32-bit data bus portion. System bus 120 is the coherency point within system 100. A bus master marks a system bus transaction as either coherent or non-coherent. Transactions that are marked as coherent are then snooped by all caching masters, such as the data cache in CPU core 110. Transactions that are marked as non-coherent are not snooped. CPU core 110 is a coherent caching master, whereas the alternate bus masters in set 150 can be programmed for coherent or non-coherent operation. For example the data cache in CPU core 110 snoops transactions on system bus 120. If a read transaction hits in the data cache, then it provides the data to system bus 120. If a write transaction hits in the data cache then the data cache array is updated with the new data. If an alternate bus master initiates a coherent cycle, then it is not necessary to write back and invalidate lines in the data cache in CPU core 110 that hit in the alternate bus master's memory buffers. If an alternate bus master is configured for non-coherent operation, however, then software must ensure that data in its memory buffers has not been stored in the data cache to prevent the data buffer from containing old, stale data.

Security engine 130 has data encryption and decryption capabilities for such tasks as the encryption and decryption of Internet packets for secure transmission. It includes a two-channel DMA controller that is able to request and gain access to system bus 120 via a system bus interface. Security engine 130 processes data in a packet controller block, and is assisted by a hardware random number generator. It also generates interrupts through a dedicated interrupt provided to interrupt controller 188, described further below.

System bus controller 140 is a logic circuit adapted to receive requests for bus ownership and grant them in an ordered fashion. One bus master is CPU core 110, which has an output for providing a request signal labeled "REQ" and an input for receiving a grant signal labeled "GNT". A set of four alternative bus masters from set 150 each also output a corresponding request signal REQ and receive a corresponding grant signal GNT. System bus controller 140 arbitrates for use of system bus 120 using a least recently used/fair arbitration scheme. This scheme prevents two or more masters from consuming the entire system bus bandwidth, while permitting low latency access to system bus 120 for masters that request the bus infrequently, such as peripherals.

System Bus Masters

System bus 120 conducts address, data, and control signals as determined by bus masters that have ownership of it. These bus masters include CPU core 110 and set of bus masters 150. As shown in FIG. 1 set 150 includes four bus masters including a direct memory access (DMA) controller 151, two Ethernet media access controllers (MACs) 152 and 153, and a universal serial bus (USB) host 154.

DMA controller 151 has a bidirectional connection to system bus 120, an output for providing a request signal REQ, and an input for receiving a grant signal GNT. DMA controller 151 has eight channels. Each channel is capable of transferring data between memory and peripherals or between memory and a memory mapped first-in, first-out (FIFO) buffer through SRAM controller 161, and using a general-purpose input/output pin as a request line. The channel characteristics are programmable via system bus 120. Software running on CPU core 110 initializes DMA controller 151 and programs its channels with the appropriate starting address, ending address, and length. In addition each channel has programmable modes of operation including identification of the peripheral device involved in the transfer, byte order (big Endian or little Endian), transfer direction, transfer size, data width, whether coherency is marked on the system bus, interrupt enable, and channel halted status.

Each of Ethernet MACs 152 and 153 performs the media access control function of layer 2 of the open systems interconnect (OSI) reference model specified in section 4 of American National Standards Institute/Institute of Electrical and Electronics Engineers (ANSI/IEEE) standard 802.3, commonly referred to as "Ethernet". Ethernet MACs 152 and 153 are bidirectionally connected to respective external physical layer (layer 1) devices using the Media Independent Interface (MII) described in the IEEE 802.3u standard. The logical link control portion of layer 2 and higher layers of the OSI stack may be performed by software running on CPU core 110. In order to perform the overhead tasks associated with frame construction, Ethernet MACs 152 and 153 include a dedicated DMA engine to access system bus 120 so that DMA controller 151 is not required. Note that since Ethernet MACs 152 and 153 actually share a common DMA engine, this DMA engine only outputs a single REQ output and receives a single GNT input instead of the two shown in FIG. 1.

USB host 154 is a device conforming to the Universal Serial Bus Specification that implements a communication architecture and interface to allow for the connection of multiple peripherals through a single port while also providing digital telephony capabilities. A USB is used to connect a USB device with a USB host. For example, a USB may connect a microcontroller (i.e., USB device) to a computer system (i.e., USB host). Each USB device is composed of a collection of independently operating endpoints. An endpoint, which is the ultimate consumer or provider of data, is a uniquely identifiable portion of a USB device that is the terminus of a communication flow between the USB host and the USB device. USB host 154 conforms to the Open HCI Interface specification, revision 1.0, as well as being compliant with revision 1.1 of the USB specification. It provides two root hub ports, port 0 and port 1, and provides four external interface pins corresponding to the positive and negative signals of each of port 0 and port 1. USB Host 154 is programmed from the system bus, and has a host enable control register that determines whether the reset done status is to be polled, which clocks to be enabled, whether the USB controller is enabled or held in reset, whether coherency is marked on the system bus, and byte order (big Endian or little Endian).

System Bus Slaves

Data processing system 100 also includes a set of bus slaves 160 bidirectionally connected to system bus 120. Set of bus slaves 160 includes a static random access memory (SRAM) controller 161, a double data rate/single data rate (DDR/SDR) memory controller 162, an enhanced joint test action group (EJTAG) controller 163, and a personal computer interconnect (PCI) interface 164.

SRAM controller 161 provides a general-purpose interface to SRAM and a variety of external peripherals and memory devices. It includes four programmable regions, each providing an external device chip select signal when accessed from system bus 120. Each of the four static bus chip selects may be programmed to support many different device types, including SRAM, NOR and NAND flash memory, read-only memory (ROM), personal computer memory card interface association (PCMCIA) compliant devices, and other kinds of input/output (I/O) peripherals. SRAM controller 161 provides three registers that are programmable from system bus 120 to define the memory location and characteristics of each of four regions, including a configuration register, a timing parameters register, and an address region control register.

DDR/SDR controller 162 provides a glueless interface for systems using either DDR or SDR synchronous dynamic random access memory (SDRAM). It supports three programmable regions having corresponding chip select output signals. Each region has a mode configuration register, an address configuration and enable register, and a write data register, and each region is programmable for operation with either DDR or SDR SDRAM devices. When a region has been programmed to DDR mode, DDR/SDR controller 162 supports DDR200, DDR266, DDR333, and DDR400 timing as specified in JEDEC Standard JESD79C with fourteen address bits and two differential clock output pairs. When a region has been programmed to DDR mode, it supports fourteen address bits with two clock outputs. In either more DDR/SDR controller 162 supports three ranks of SDRAM devices. Each rank can be either one 32-bit SDRAM device or two 16-bit SDRAM devices. Each device can contain either two or four banks. DDR/SDR controller 162 also includes an 8-entry open bank address tag with a least-recently-used (LRU) replacement algorithm, and supports stride transfers initiated by DMA controller 151.

EJTAG (Enhanced Joint Test Action Group) controller 163 implements a modified version of the JTAG test interface (specified in IEEE 1149.1) described in the EJTAG 2.5 specification published by MIPS Computer, Inc. EJTAG controller 163 supports the extended instructions SDBBP and DERET, debug exceptions, extended CP0 registers known as DEBUG, DEPC, and DESAVE, the EJTAG memory range from 0xFF200000 through 0xFF3FFFFF, processor bus breakpoints (EJTAG 2.0), memory overlay (EJTAG 2.0, and an EJTAG test access port per IEEE 1149.1. EJTAG controller 163 also supports an implementation-specific feature by providing instruction and data breakpoints through the watch exception.

PCI Interface controller 164 is compatible with version 2.2 of the PCI Interface standard. It bridges transactions between system bus 120 and an external PCI bus operating at either 33 MHz or 66 MHz. PCI interface controller 164 provides a glueless interface to up to four external PCI devices. It has several flexible modes of operation. For example, it can execute processor-initiated master transactions to the PCI bus as well as accept external PCI target transactions to local memory.

Peripheral Bus Devices

Peripheral device set 180 includes several lower bandwidth peripherals connected to peripheral bus 172 and accessible from system bus 120 through bus bridge 170. Bus bridge 170 appears as a bus slave to system bus 120. The peripherals in set 180 include a real-time clock (RTC) and time-of-year (TOY) timer 181, a power management controller 182, four programmable serial controllers (PSCs) 183, a set of three universal asynchronous receiver-transmitters (UARTs) 185, an I2S bus controller 186, a set of 43 general purpose I/O pins 187, an interrupt control block 188, and a USB device controller 189. The basic function of each of these blocks is described in TABLE I:

TABLE I

| Block | Description |
| --- | --- |
| RTC AND TOY 181 | Real time clock and time-of-year clock. The RTC uses a counter to function as a conventional real time clock. The TOY clock is designed to operate as a continuously running clock. In hibernate mode, the TOY clock continues to operate and is firewalled from the rest of the chip. |
| POWER MGMT 182 | Power management controller. This block provides multiple power saving options that can be chosen depending on whether power conservation or system responsiveness is most critical. |
| PSCs 183 | Synchronous serial interfaces. These two ports are designed to provide a simple connection to external serial devices, with one port supporting the synchronous serial interface (SSI) protocol and the other supporting a subset of the serial peripheral interface (SPI) protocol. |
| UARTs 185 | Universal asynchronous receiver/transmitters. These three channels provide serial links for devices such as keyboards and are similar to the personal computer industry standard 16550 UART. |
| GPIO 187 | General-purpose I/O ports. These ports are programmed using a data register and a data direction register and the pin functions are shared with other devices. |
| INTERRUPT CONTROL 188 | Interrupt controllers. Each of two interrupt controllers supports 32 interrupt sources and generates interrupt signals that are input to CPU core 110. |
| USB-DEVICE 189 | Universal serial bus device controller, supporting endpoints 0, 2, 3, 4, and 5. |

Each of these blocks has a set of registers associated with their particular operation. In general they also have an associated base address register that defines the starting address of their register block. The devices' registers are accessed from system bus 120 and the devices themselves transfer data over system bus 120 through bus bridge 170.

Power Management

According to the present invention data processing system 100 has circuitry within multiple power supply voltage domains. In a new mode known as the "hibernate" mode, power may be removed from all the power supply voltage domains except one. In the illustrated embodiment this power supply voltage domain includes a time-of-year (TOY) clock circuit that maintains a real-time clock. Maintaining the TOY clock while powering down the rest of the chip is especially useful for battery-powered applications such as personal digital assistants (PDAs), smart cellular telephones, hand held Internet appliances, and the like.

During hibernate mode data processing system 100 erects a "firewall" between the TOY clock and the rest of the chip. As used herein "firewall" means a circuit that is interposed in some way between two other circuits to keep one from affecting the other, in a manner analogous to that of a fireproof wall erected to prevent the spread of fire from one room to the next. In the illustrated embodiment during hibernate mode a firewall circuit is responsive to the receipt of a special firewall input signal, labeled "$\overline{\text{FWTOY}}$", to keep internal circuitry which is powered down from affecting the TOY clock, which continues to receive power and operate during hibernate mode.

Figure 2A:
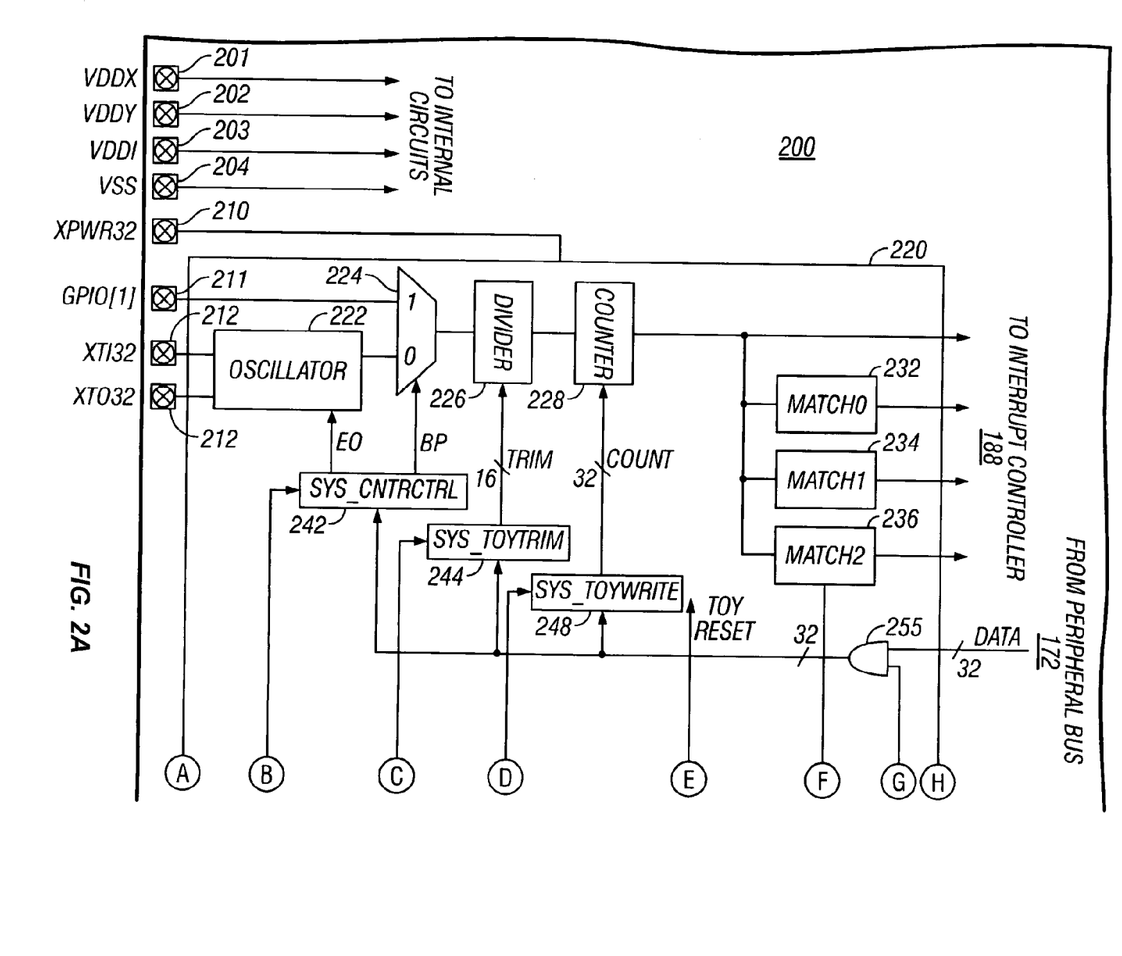
FIGS. 2a-2b illustrate a portion of the data processing system of FIG. 1 including a TOY clock that forms a portion of the RTC and TOY block.
Figure 2B:
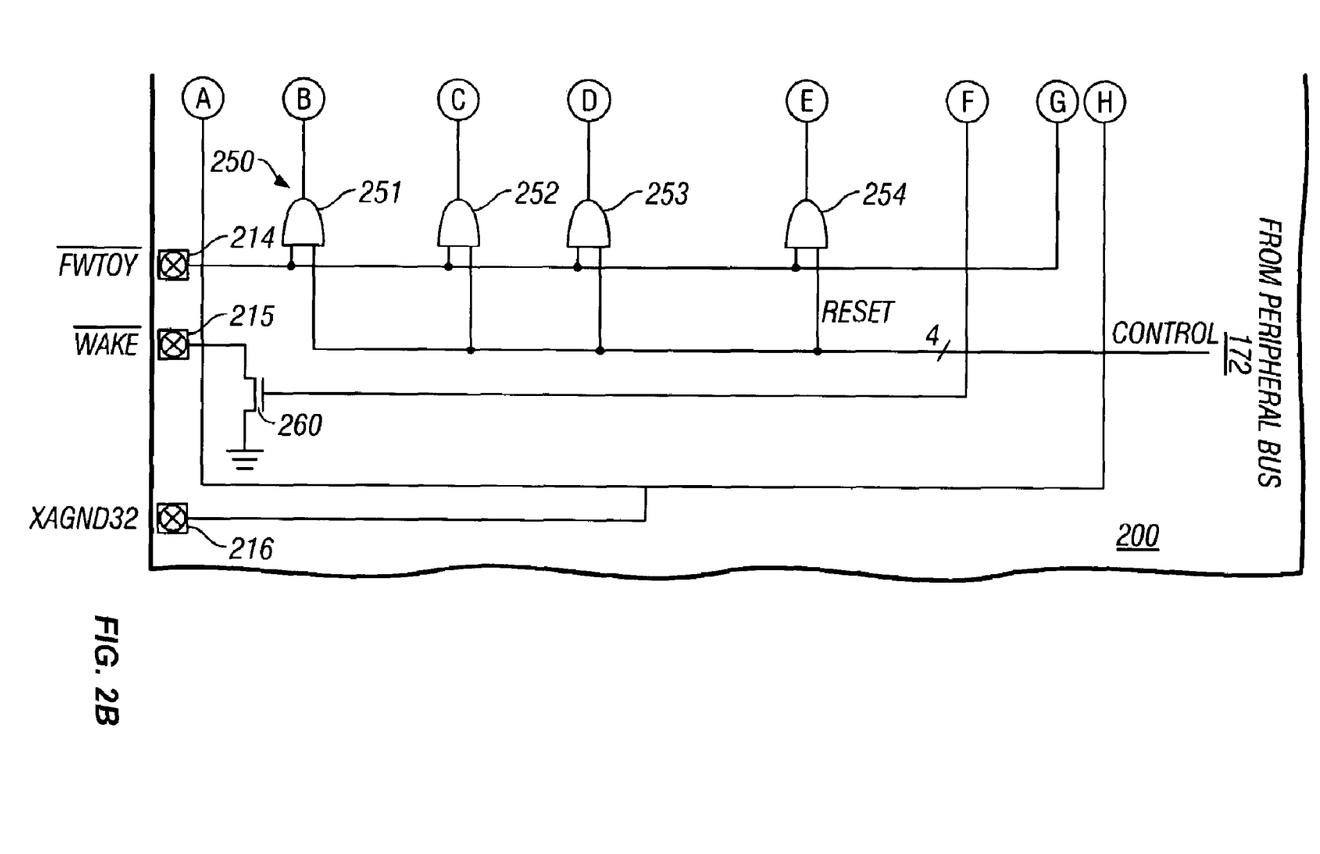

Reference is now made to FIG. 2, which illustrates a portion 200 of data processing system 100 including a TOY clock 220 that forms a portion of RTC and TOY block 181. Portion 200 includes several integrated circuit terminals 201-204 and 210-216 in the form of bonding pads suitable for connection to integrated circuit package terminals by known techniques such as wire bonding or bumping. Note that FIG. 2 is a functional diagram and is not meant to imply any spatial relationship on the periphery of the integrated circuit die between the various terminals.

Terminals 201-204 form power supply voltage terminals for internal circuitry. Power supply terminals 201-203 receive positive power supply voltages labeled "VDDX", "VDDY", and "VDDI", respectively, and power supply terminal 204 receives a ground power supply voltage labeled "VSS". A power supply for most input/output circuitry in an I/O power supply voltage domain is formed between VDDX and VSS. A power supply for the input/output circuitry associated with DDR/SDRAM controller 162 in a DDR/SDRAM I/O power supply voltage domain is formed between VDDY and VSS. A power supply for internal circuitry in an internal circuitry power supply voltage domain is formed between VDDI and VSS. These power supply voltages can assume optimal levels appropriate to their domains. For example it is desirable to operate VDDI at a relatively low voltage, for example 1.2 volts, to minimize power consumption. However the I/O power supplies need higher voltages, for example 3.3 volts, to allow integrated circuit 100 to interface properly with external components. Note that circuit blocks include levels shifters for exchanging signals between voltage domains, which helps avoid crowbar currents.

The remaining terminals 210-216 are associated with TOY clock 220 and include a power supply terminal 210 for receiving a positive power supply voltage labeled "XPWR32", an input/output terminal 211 for conducting a general purpose input/output signal labeled "GPIO[1]" which in one mode provides an input to TOY clock 220, an input terminal 212 for receiving a crystal input signal labeled "XTI32", an output terminal 213 for providing a crystal output signal labeled "XTO32", an input terminal 214 for receiving the $\overline{\text{FWTOY}}$ input signal, an output terminal 215 for providing a control signal labeled "$\overline{\text{WAKE}}$", and a power supply terminal 216 for receiving a ground power supply voltage labeled "XAGND32". A power supply for the circuitry associated with TOY clock 220 and a crystal oscillator, known as the 32.768 kHz oscillator supply voltage domain, is formed between XPWR32 and XAGND32. XPWR32 is preferably relatively high, for example about 3.3 volts, to ensure proper operation of a crystal oscillator, described below.

TOY clock 220 includes an oscillator 222 having a control input terminal for receiving a control signal labeled "EO", a crystal input terminal connected to terminal 212, a crystal output terminal connected to terminal 213, and a clock output terminal. The recommended external crystal has a fundamental frequency of 32.768 kHz, which is the well-known color burst frequency. A multiplexer 224 has a first input terminal labeled "1" connected to terminal 211, a second input terminal labeled "0" connected to the output terminal of oscillator 222, a control input terminal for receiving a signal labeled "BP", and an output terminal. TOY clock 220 uses multiplexer 224 to select between one of two possible clock sources based on control signal BP, namely an externally supplied clock received on the GPIO[1] signal pin, terminal 211, or the crystal controlled signal received from the output terminal of oscillator 222.

A divider 226 has an input terminal connected to the output terminal of multiplexer 224, a preset input terminal for receiving a 16-bit value labeled "TRIM", and an output terminal. Divider 226 divides the clock signal selected by multiplexer 226 by a programmable amount equal to the TRIM bits plus one to provide a divided clock signal to the output terminal thereof.

Counter 228 has an input terminal connected to the output terminal of divider 226, a preset input terminal for receiving a 32-bit value labeled "COUNT", and an output terminal. Counter 228 counts the number of pulses at the output of divider 226 to provide a count value to the output terminal thereof.

TOY clock 220 also includes three match circuits 232, 234, and 236. Each match circuit has an input connected to the output terminal of counter 228, and an output terminal that provides an interrupt output signal when the output of counter 228 matches a programmable match value set in a corresponding match register. Additional features of match circuits 232, 234 and 236 are not explicitly illustrated in FIG. 2. For example each match circuit includes a data input terminal that receives its programmable match value, and a write enable terminal that receives a corresponding write enable signal. The programmable match value is received from a data portion of peripheral bus 172 in a manner that will be described more fully below. The write enable signal is active when an access is made to a memory-mapped location corresponding to the particular match register. The outputs of counter 228 and of each match register are provided to corresponding inputs of interrupt controller 188 of FIG. 1. Thus the occurrence of a particular count value can trigger an interrupt and CPU core 110 can take an appropriate action after receiving the interrupt.

TOY clock 220 also includes a set of registers useful for controlling the operation thereof. FIG. 2 illustrates three exemplary registers useful in understanding the present invention including a control register 242 labeled "sys_cntrctrl", a trim register 244 labeled "sys_toytrim", and a count register 246 labeled "sys_toywrite". Control register 242 has a data input terminal connected to a 32-bit DATA bus that forms a portion of peripheral bus 172 of FIG. 1, a write enable input terminal, a first output terminal connected to the control input terminal of buffer 224 for providing the EO bit, and a second output terminal connected to the control input terminal of multiplexer 226 for providing the BP bit. Control register 242 is operable to store a control register value therein when the signal at its write control input terminal is active. It also includes additional control bits, not shown in FIG. 2, that control other aspects of TOY clock 220. Trim register 244 has a data input terminal connected to the 32-bit data bus, a write control input terminal, and an output terminal connected to the trim input terminal of divider 228 for providing a 16-bit value labeled "TRIM". Trim register 244 is operable to store a divider value therein when the signal at its control input terminal is active. Count register 246 has a data input terminal connected to the 32-bit data bus, a write control input terminal, and an output terminal connected to the count input terminal of counter 230 for providing a 32-bit value labeled "COUNT". Count register 246 is operable to store an initial counter value therein when the signal at its control input terminal is active.

In order to implement the firewall mechanism TOY clock 220 includes a firewall circuit 250. Firewall circuit 250 includes AND gates 251-255. Each AND gate has a first input terminal connected to input terminal 214 for receiving the firewall signal $\overline{FWTOY}$ therefrom. AND gate 251 has a second input terminal for receiving a first control signal from a control bus, and an output terminal connected to the control input terminal of register 242. AND gate 252 has a second input terminal for receiving a second control signal from the control bus, and an output terminal connected to the control input terminal of register 244. AND gate 253 has a second input terminal for receiving a third control signal from the control bus, and an output terminal connected to the control input terminal of register 246. AND gate 254 has a second input terminal for receiving an input signal labeled "RESET", and an output terminal for providing a signal labeled "TOY RESET". AND gate 255 is representative of thirty-two AND gates each having a first input terminal connected to input terminal 214 for receiving the firewall signal therefrom, a second input terminal connected to a corresponding bit of a 32-bit DATA bus portion of peripheral bus 172, and an output terminal for providing the internal DATA value.

Firewall circuit 250 uses three mechanisms to place a "firewall" between circuitry in the XPWR23 domain and all other circuits. The first firewall mechanism prevents select signals on the CONTOL portion of peripheral bus 172, which may have indeterminate values during hibernate mode, from spuriously selecting any of registers 242, 244, and 246. Each of registers 242, 244, and 246 is a memory-mapped register that is selected when an address conducted on peripheral bus 172 matches its corresponding address in the memory map. During normal operation CPU core 110 can update any one of these registers by outputting a corresponding address on system bus 120. Bus bridge 170 recognizes that the access is within a range of addresses associated with peripheral bus 172 and drives the system address signals onto peripheral bus 172. Decoder circuitry not shown in FIGS. 1 and 2 compares the address conducted on peripheral bus 172 to the base addresses of each of registers 242, 244, and 246 and outputs a select signal on a CONTROL bus portion of peripheral bus 172 to select the corresponding register. AND gates 251, 252, and 253 gate off the select signal during hibernate mode. Thus the first firewall mechanism preserves the control registers from being spuriously selected resulting in their contents being overwritten.

The second firewall mechanism firewalls the TOY RESET signal. TOY RESET is provided to most circuit blocks in TOY clock 220 to return them to appropriate initial states. However during hibernate mode TOY clock 220 continues to operate uninterrupted. AND gate 254 prevents indeterminate values on the RESET signal of peripheral bus 172 from resulting in the activation of TOY RESET. Thus the second firewall mechanism prevents TOY clock 220 from being spuriously reset during hibernate mode.

The third firewall mechanism firewalls the DATA bus. During hibernate mode the signals on the DATA bus portion of peripheral bus 172 assume indeterminate levels. These signals may actually assume an intermediate logic state at a voltage between a logic low voltage and a logic high voltage. Normally CMOS logic circuits only consume power when the input signals transition through intermediate logic states. However if an input signal remains at the intermediate logic state during hibernate mode then a logic circuit to which it is connected in TOY clock 220 would experience a virtual short. This virtual short would cause a relatively high leakage current and defeat the extremely low power consumption otherwise provided during hibernate mode. Thus the third firewall mechanism prevents unnecessary power consumption during hibernate mode caused by indeterminate levels on input signals.

Thus firewall circuit 250 builds a firewall between circuits in the XPWR32 domain and circuits in all other power domains. Firewall circuit 250 uses these three exemplary mechanisms to ensure continued safe operation during hibernate mode.

Note that in other embodiments other firewall mechanisms may be used. Note also that registers 242, 244, and 246 are merely exemplary and TOY clock 220 includes additional registers that are firewalled in a similar manner during hibernate mode. For example each of match circuits 232, 234, and 236 include corresponding match registers that are memory-mapped and can be written to during normal operation. Thus firewall circuit 250 includes further circuitry to cause spurious values from being written to these match registers. Firewall circuit 250 may also be implemented using other logic circuitry besides the AND gates shown in FIG. 2. For example, the same function could be accomplished using NOR gates with negative logic, transmission gates with pull-down elements, etc. In addition other circuits or types of circuits may be placed inside the firewall. For example in the illustrated embodiment the RTC portion of RTC and TOY block 181 and POWER MANAGEMENT block 182 are also in the XPWR32 domain and are placed within the firewall.

TOY clock 220 also includes a mechanism for externally waking up data processing system 100 from hibernate mode. Since TOY clock 220 is still operational in hibernate mode, it advantageously provides an open-drain output signal, the $\overline{WAKE}$ signal, to indicate that the output of 228 has reached the value programmed into MATCH2 register 236. Thereafter external power control circuitry not shown in FIG. 2 can wake up system 100 by restoring power to the other power supply voltage domains. Thus for example an external power controller chip could be designed that would generate different desired voltage levels for each of the power supply voltage domains, disable each of these domains appropriately in each low power state of operation, and respond to the $\overline{WAKE}$ signal to restore data processing system 100 to normal operation mode.

Accordingly note that in the illustrated embodiment data processing system 100 is capable of operating in any of the power states shown in TABLE II below:

TABLE 11

| STATE NAME | XPWR32 | VDDX | VDDY | VDD1 |
|---|---|---|---|---|
| Power Down | OFF | OFF | OFF | OFF |
| Full Power-on | ON | ON | ON | ON |
| Sleep, VDDXOK = 1 | ON | ON | X | X |
| Hibernate, VDDXOK = 0 | ON | OFF | X | X |

Two registers not illustrated in FIG. 2 are important in the operation of TOY clock 220 during hibernate mode. The first register, known as the "sys_wakesrc" register, is useful to system operation upon waking up from hibernate mode. Activating RESET, powering up, or waking up from hibernate mode all cause CPU core 110 to start fetching instructions from an initial address known as a boot vector. The sys_wakesrc register includes status bits that allow software to distinguish between hibernate wakeup and normal reset or power up, and to take appropriate action. For example if the system is powering up, TOY clock 220 should be initialized. However if the system is waking up from hibernate mode, TOY clock 220 does not need to be initialized. The second register is known as the "sys_wakemsk" register, and includes a bit to determine whether the $\overline{\text{WAKE}}$ signal is activated in response to a match in MATCH2 register 236. It also includes a bit to determine whether the system can be awakened from the SLEEP state in response to a match in MATCH2 register 236, and bits to determine whether any of a group of general purpose I/O bits can cause a wakeup from the SLEEP state. Both the sys_wakesrc and the sys_wakemsk registers are firewalled in the same manner as registers 242, 244, and 246 during hibernate mode.

Figure 3:
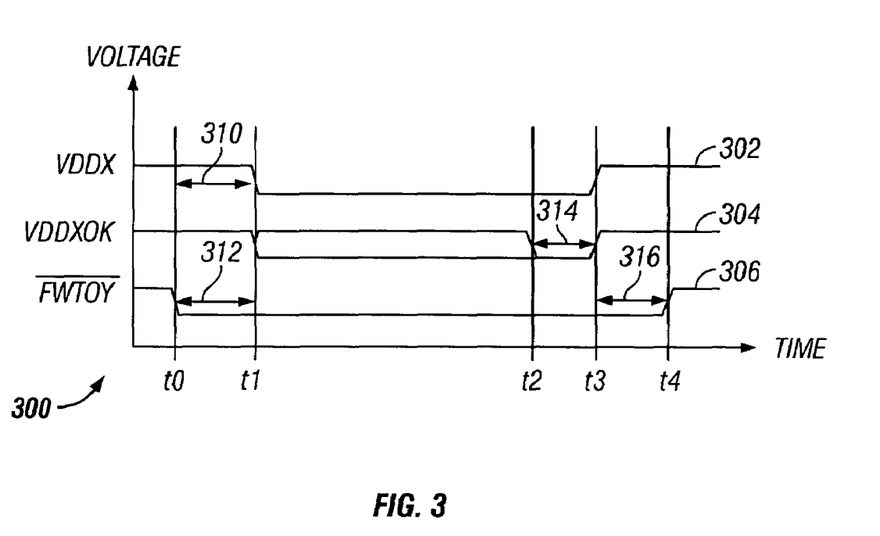
FIG. 3 illustrates a timing diagram of signals associated with the time of year clock of FIG. 2.

FIG. 3 illustrates a timing diagram 300 of signals associated with data processing system 100 entering hibernate mode. In timing diagram 300 the vertical axis represents voltage and the horizontal axis represents time. Timing diagram 300 illustrates VDDX in a waveform 302, a VDDX validation signal labeled "VDDXOK" in a waveform 304, and firewall signal $\overline{\text{FWTOY}}$ waveform 306. At a time t0 data processing system 100 enters hibernate mode in response to the activation of the firewall signal $\overline{\text{FWTOY}}$. $\overline{\text{FWTOY}}$ must be asserted at least a minimum setup time 310 before the removal of VDDX and at least a minimum setup time 312 before the inactivation of VDDXOK at time t1. Once $\overline{\text{FWTOY}}$ asserts, the operation of TOY clock 220 is protected and the de-assertion of VDDXOK does not affect it. VDDXOK may then de-assert at any time or even become indeterminate for a length of time, provided that it resolves to a logic low value at least a minimum setup time 314 before its subsequent activation at time t3.

While FIG. 3 shows the minimum timing relationships required for entry into and exit from hibernate mode, other system configurations are possible. For example it is possible to not use hibernate in a so-called "never hibernate" system by tying both XPWR32 and $\overline{\text{FWTOY}}$ to VDDX. Thus XPWR32 ramps with VDDX and $\overline{\text{FWTOY}}$ is seen as de-asserted when VDDXOK rises, and time periods 312 and 316 are zero. However in a so-called "always hibernate" system, $\overline{\text{FWTOY}}$ is tied to VDDXOK. VDDXOK is de-asserted before VDDX drops and remains de-asserted until VDDX rises, ensuring that the minimum timing requirements for $\overline{\text{FWTOY}}$ are met. In the "always hibernate" system every activation of VDDXOK causes a hibernate wakeup. XPWR32 is tied to a supply, such as a battery, which is always valid even during hibernate.

Note that the integrated circuit 100 could be part of a larger computer system that includes both integrated circuit 100 and a power controller chip. This power controller chip would not only generate the power supply voltages in each of the available power supply voltage domains but also control the transition between low power states. Such a power supply controller chip would activate VDDXOK and $\overline{\text{FWTOY}}$ appropriately to enter hibernate mode, and would awaken from hibernate mode using the $\overline{\text{WAKE}}$ signal. Such a system includes substantial flexibility in minimizing power consumption while using the integrated TOY clock 220. Thus the design of the power controller chip can be greatly simplified.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An integrated circuit comprising:
a firewall input terminal for receiving a firewall input signal;
a first circuit coupled to a first power supply voltage terminal and having an output for providing a control signal; and
a clock circuit coupled to a second power supply voltage terminal, to said firewall input terminal, and to said first circuit, wherein when said firewall input signal is inactive, an activation of said control signal affects the operation of said clock circuit, and when said firewall input signal is active, an activation of said control signal does not affect the operation of said clock circuit.

2. The integrated circuit of claim 1 wherein said firewall input signal is active to indicate that a voltage on said first power supply voltage terminal is not valid while a voltage on said second power supply voltage terminal is valid.

3. The integrated circuit of claim 1 wherein said first circuit comprises a central processing unit core.

4. The integrated circuit of claim 1 wherein said clock circuit is characterized as being a time of year clock.

5. The integrated circuit of claim 1 further comprising:
a wake terminal coupled to an output of said clock circuit; and
wherein said clock circuit is to configure said wake terminal to an active state in response to a clock value of the clock circuit reaching a predetermined value.

6. The integrated circuit of claim 5 further comprising a transistor having a first current electrode coupled to said wake terminal, a control electrode coupled to said output of said clock circuit, and a second current electrode coupled to a ground power supply voltage terminal.

7. The integrated circuit of claim 1 wherein said clock circuit comprises a register and said first circuit activates said control signal in order to access said register.

8. The integrated circuit of claim 1 wherein said clock circuit is further coupled to a first ground terminal and said second circuit is further coupled to a second ground terminal.

9. An integrated circuit comprising:
first and second power supply voltage terminals;
a firewall input terminal for receiving a firewall input signal wherein said firewall input signal is active to indicate that a voltage on said first power supply voltage terminal is not valid while a voltage on said second power supply voltage terminal is valid;

a first circuit coupled to said first power supply voltage terminal and having a control output; and a second circuit coupled to said second power supply voltage terminal and having a first control input coupled to said control output of said first circuit and a second control input for receiving said firewall input signal, wherein said control output affects the operation of said second circuit selectively in response to said firewall input signal.

10. The integrated circuit of claim 9 wherein said first circuit comprises a central processing unit core.

11. The integrated circuit of claim 10 wherein said second circuit comprises a clock circuit.

12. The integrated circuit of claim 11 wherein said clock circuit is a time of year clock.

13. The integrated circuit of claim 11 further comprising a wake terminal coupled to an output of said clock circuit.

14. The integrated circuit of claim 13 further comprising a transistor having a first current electrode coupled to said wake terminal, a control electrode coupled to said output of said clock circuit, and a second current electrode coupled to a ground power supply voltage terminal.

15. The integrated circuit of claim 14 wherein said transistor is characterized as being a metal-oxide-semiconductor (MOS) transistor.

16. The integrated circuit of claim 9 further comprising:
a first ground power supply voltage terminal coupled to said first circuit; and
a second ground power supply voltage terminal coupled to said second circuit.

17. The integrated circuit of claim 9 wherein said first and second power supply voltage terminals and said firewall input terminal comprise bonding pads of the integrated circuit.

18. A timer comprising:
a firewall input terminal for receiving a firewall input signal;
a control input terminal for receiving a control signal;
an output terminal for providing a first output signal;
a firewall circuit having a first input terminal coupled to said firewall input terminal, a second input terminal for receiving said control signal, and an output terminal for providing a firewalled control signal, wherein when said firewall input signal is active, said firewalled control signal is inactive regardless of a state of said control signal, and when said firewall input signal is inactive, a state of said firewalled control signal is determined by said control signal;
a first clock input terminal for receiving a first clock signal, wherein the timer provides said first output signal in response to said first clock signal in at least one mode of operation thereof;
a second clock input terminal for receiving a second clock signal; and
a clock source selector for selecting one of said first clock signal and said second clock signal as an internal clock signal for use by the timer, said clock source selector comprising:
a multiplexer having a first input terminal for receiving said first clock signal, a second input terminal for receiving said second clock signal, a control input terminal for receiving a select signal, and an output terminal; and a divider having an input terminal coupled to said output terminal of said multiplexer, and an output terminal for providing said internal clock signal; and a match circuit for providing a second output signal in response to said first output signal equaling a predetermined match value; and a wake output terminal for providing a wake signal wherein the timer activates said wake signal in response to said second output signal; and wherein when active said firewalled control signal affects an operation of the timer.

19. The timer of claim 18 further comprising a transistor having a drain coupled to said wake output terminal, a gate for receiving said second output signal, and a source coupled to a ground power supply voltage terminal.

20. A method for operating an integrated circuit comprising the steps of:
receiving operational power for a first internal circuit via a first power supply voltage terminal;
receiving operational power for a second internal circuit via a second power supply voltage terminal;
receiving a firewall input signal at a firewall input terminal wherein when active said firewall input signal indicates that a voltage on said first power supply voltage terminal is not valid while a voltage on said second power supply voltage terminal is valid; and
firewalling said second internal circuit from said first internal circuit in response to an activation of said firewall input signal.

21. The method of claim 20 further comprising the step of:
providing an output signal from said first internal circuit to said second internal circuit; and
wherein said step of firewalling comprises the step of:
isolating said output signal from said second internal circuit.

22. The method of claim 21 wherein said step of providing said output signal comprises the step of:
providing a write enable signal.

23. The method of claim 21 wherein said step of providing said output signal comprises the step of:
providing a reset signal.

24. The method of claim 21 wherein said step of providing said output signal comprises the step of:
providing a data signal.

25. The method of claim 21 wherein said step of isolating comprises the step of:
coupling said output signal to a first input terminal of a logic gate;
coupling said firewall input signal to a second input terminal of said logic gate; and
coupling an output of said logic gate to said second internal circuit.

26. The method of claim 25 wherein said step of coupling said output signal to said first input terminal of said logic gate comprises the step of:
coupling said output signal to a first input terminal of an AND gate.

27. The method of claim 25 wherein said step of coupling said output of said logic gate to said second circuit comprises the step of:
coupling said output of said logic gate to a control register of said second circuit.

28. A method for operating a computer system comprising the steps of:
- providing operational power to a first internal circuit of an integrated circuit via a first power supply voltage terminal;
- providing operational power to a second internal circuit via a second power supply voltage terminal;
- activating a firewall input signal; and
- removing a voltage on said first power supply voltage terminal after said step of activating said firewall input signal while keeping a voltage on said second power supply voltage terminal valid, said step of removing said voltage on said first power supply voltage terminal comprising the step of deactivating a control signal at an input terminal of said integrated circuit wherein said control signal indicates whether said voltage on said first power supply voltage terminal is valid.

29. The method of claim 28 further comprising the steps of:
- restoring said voltage on said first internal circuit via said first power supply voltage terminal; and
- de-activating said firewall input signal after said step of restoring.

30. The method of claim 28 comprising the step of:
- performing each of said aforementioned steps using a power control integrated circuit.

31. The method of claim 28 wherein said step of providing operational power to said first internal circuit comprises the step of:
- providing operational power to a central processing unit core.

32. The method of claim 31 wherein said step of providing operational power to said second internal circuit comprises the step of:
- providing operational power to a clock circuit.

* * * * *